United States Patent [19]

Bright

[11] Patent Number: 4,858,385
[45] Date of Patent: Aug. 22, 1989

[54] SEALS

[75] Inventor: Robert G. Bright, Viersen, Fed. Rep. of Germany

[73] Assignee: Draftex Industries Limited, Edinburgh, Scotland

[21] Appl. No.: 127,478

[22] Filed: Dec. 2, 1987

[30] Foreign Application Priority Data

Jan. 23, 1987 [GB] United Kingdom ............... 8701477

[51] Int. Cl.⁴ ............................................. E06B 7/16
[52] U.S. Cl. ...................................... 49/488; 49/491; 49/492; 49/498
[58] Field of Search ................. 49/488, 491, 492, 494, 49/498

[56] References Cited

U.S. PATENT DOCUMENTS

| 1,998,791 | 4/1935 | Schanz | 49/492 X |
| 3,145,434 | 8/1964 | Major | 49/491 |
| 3,165,793 | 1/1965 | Lynch | 49/491 X |
| 3,167,827 | 2/1965 | Alley et al. | 49/492 |
| 3,309,817 | 3/1967 | Fisher | 49/492 |
| 4,112,623 | 9/1978 | McPherson | 49/488 |
| 4,441,301 | 4/1984 | Benson | 49/488 X |
| 4,542,610 | 9/1985 | Weimar | 49/491 |

FOREIGN PATENT DOCUMENTS

| 1021954 | 3/1966 | United Kingdom | 49/491 |
| 1183660 | 3/1970 | United Kingdom . | |
| 1522347 | 8/1978 | United Kingdom . | |
| 2012849 | 8/1979 | United Kingdom . | |
| 2037238 | 7/1980 | United Kingdom . | |
| 2058892 | 4/1981 | United Kingdom . | |
| 2060039 | 4/1981 | United Kingdom . | |
| 2092652 | 8/1982 | United Kingdom . | |

Primary Examiner—Philip C. Kannan
Attorney, Agent, or Firm—Leydig, Voit & Mayer

[57] ABSTRACT

A door seal is mounted to run around the periphery of the door in a vehicle body and is mounted relatively adjacent to the outer surface of the door so as not only to perform the normal sealing action between the door and door frame but also to ensure that soiling of the door aperture itself by ingress of dirt and moisture is prevented or reduced and to reduce wind noise. The door seal has a sealing part integrally extruded with a mounting part. The latter defines a hollow interior of triangular cross-section in which is mounted a metal carrier. The base of the hollow interior is closed off by a web which supports an adhesive strip for mounting the seal on the door. The metal carrier has an extrusion which is slightly longitudinally compressible so as to permit controlled compression of the adjacent part of the seal where it is curved to follow a curve in the door. A non-stretchable tape may be incorporated to prevent unsightly stretching of the outside of the door seal at such a bend. The metal carrier provides a support against which the sealing part is partially compressed when the door closes.

15 Claims, 3 Drawing Sheets

SEALS

BACKGROUND OF THE INVENTION

The invention relates to seals and sealing strips particularly though not exclusively for sealing around openings closable by closure members such as doors. An exemplary application of the invention is for sealing around door and similar openings in motor vehicle bodies.

BRIEF SUMMARY OF THE INVENTION

According to the invention, there is provided a seal for acting between the closure member of a framed opening and the frame of the opening, comprising a longitudinally extending sealing strip mounted on the periphery of the closure member and having a relatively soft sealing part which is at least partially compressible between the closure member and the frame of the opening and a relatively rigid support part positioned adjacent the sealing part for supporting the latter during its partial compression.

According to the invention, there is also provided an arrangement for sealing an at least partially recessed framed opening closable by a door or like closure member which at least partially enters the recess, comprising a seal extending at least partially around the periphery of the door and mounted thereon so as to be at least partially compressed between the closing door and the frame, and carrying an extension along its length which is positioned so as to seal between at least part of the periphery of the door and the adjacent edge or wall of the recess.

DESCRIPTION OF THE DRAWINGS

Door seals embodying the invention will now be described by way of example only and with reference to the accompanying diagrammatic drawings in which.

DESCRIPTION OF PREFERRED EMBODIMENTS

Figure 1:
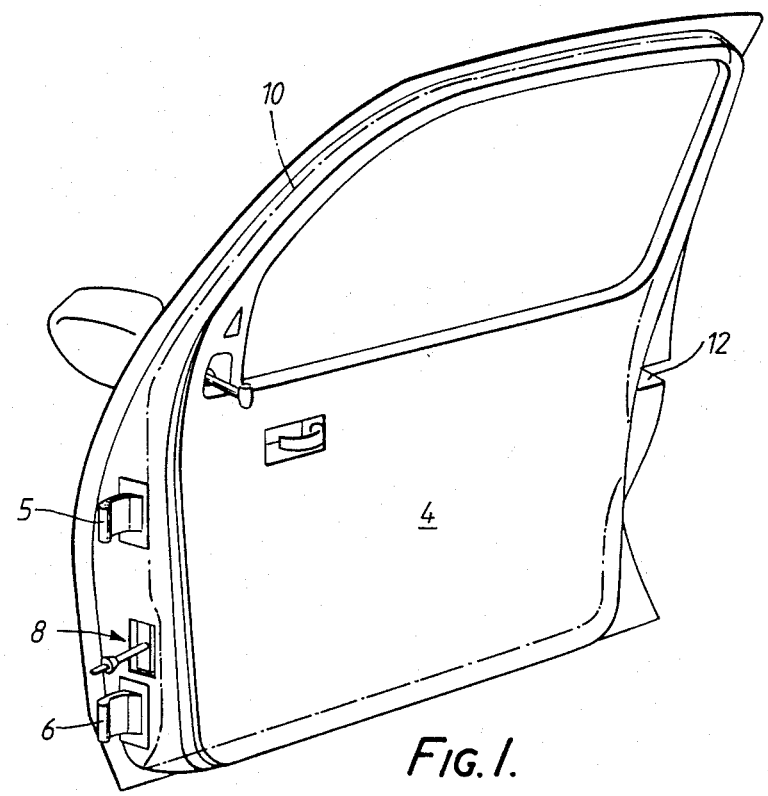
FIG. 1 is a diagrammatic perspective view of a motor vehicle body door.

FIG. 1 shows a perspective view of a conventional motor vehicle body door 4, a front door in this example which is supported by hinges 5 and 6 its leading edge, a conventional check strap 8 being positioned between the hinges. In accordance with a feature of the invention, the seal for sealing between the periphery of the door and the door opening is mounted on the peripheral edge of the door as shown by the chain-dotted line 10. As shown, the path of the seal passes inside (that is, nearer to the inside face of the door than the outside face thereof) of the hinges 5 and 6 and the check strap 8. At the trailing edge of the door, there is a recess 12 for receiving that part of the door latching and locking mechanism which is mounted on the body itself, and the path of the door seal 10 passes outside this recess.

Figure 2:
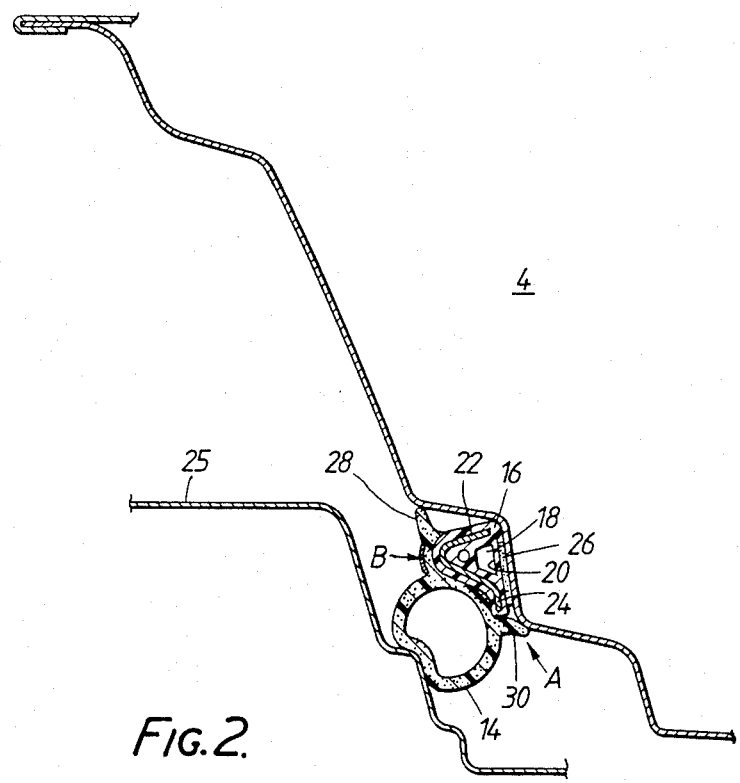
FIG. 2 is a diagrammatic cross-section through part of the door showing one of the door seals mounted in position.

FIG. 2 shows one form of the door seal in diagrammatic cross-section, as mounted on the door 4. The seal is of extruded construction, such as of plastics or rubber construction but preferably rubber, and has a longitudinally extending tubular sealing part 14 which runs alongside, and is integrally extruded with, a mounting section 16. Preferably, the sealing section 14 is extruded in sponge or cellular form while the mounting section 16 is solid or unfoamed. The mounting section 16 has a longitudinally extending hollow interior 18 of generally triangular cross-section which is closed off by a thin integrally extruded web 20. A metal carrier 22, to be described in more detail below, is mounted within the interior 18, preferably by extruding the rubber material around it using a cross-head extruder. As shown in FIG. 2, the metal carrier 22 is extended at 24 so as to extend partly under the sealing section 14.

The seal is secured to the surface of the door 4 by means of a strip of adhesive material 26 which acts between the underside of the web 20 and the surface of the door. The adhesive strip may be in the form of a tape carrying adhesive material on side. The adhesive material adheres to the underside of the web 20 and is initially covered by the tape which is in place while the door seal is delivered to the vehicle manufacturer. He then peels off the tape so as to uncover the adhesive layer which is then used to secure the door seal in position.

The door seal is positioned on the door so as to run completely or substantially completely around the periphery of the door as shwon in FIG. 1. The seal may be supplied to the manufacturer in the form of a strip of indeterminate length and he then cuts off an appropriate length to suit the door. Instead, it could be supplied in the form of a pre-formed closed loop, designed to fit a specific type of door. As shown in FIG. 1, the position of the door seal on the door varies around the periphery of the door. It is necessary for the door seal to pass inside the door hinges 5 and 6, rather than outside these items, in order to prevent trapping when the door is opened. It is necessary for the seal to pass outside the locking mechanism recess 12 in order to allow the striker etc mechanism on the door frame to pass into the recess 12 when the door is closed. In general, however, the door seal is mounted close to the outside of the door so as to act between this relatively outer part of the door and the corresponding part of the door frame 25 (see FIG. 2) when the door is closed. Such relatively outward positioning of the door seal has a number of advantages: thus, it keeps the outer parts of the door aperture relatively clean, by sealing them against the ingress of air-borne dirt and moisture and in this respect is advantageous compared with the more inboard seal positioning which occurs with the type of door seal mounted not on the door itself but on the flange running around the door frame. In addition, the relatively outward positioning of the door seal described is of advantage in reducing wind noise.

As shown in FIG. 2, the door seal may be provided with lips for improving its sealing action. Thus, as shown the gripping part 16 has a lip 28 acting on an inner part of the door surface while the sealing part 14 has a lip 30 acting on an outer part of the door surface.

Figure 3:
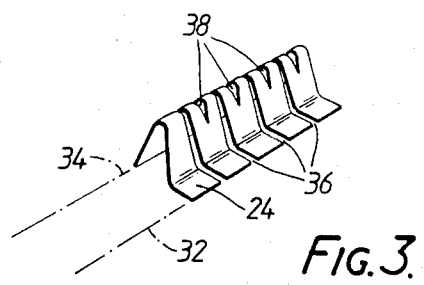
FIG. 3 is a perspective view of a carrier for the seal of FIG. 2.

The metal carrier 22 may take various forms. However, an advantageous form is shown in FIG. 3 where it consists of a channel-shaped structure having slits each of which runs from one of the longitudinally extending edges 32,34 of the carrier towards, but stopping short of, the other thereof. Thus, FIG. 3 shows slots 36 running from the edge 32 towards but stopping short of the edge 34 and slots 38 running from the edge 34 towards but stopping short of the edge 32. FIG. 3 also shows the extended part 24 of the carrier.

The main purpose of the metal carrier is to provide a relatively rigid support for the door seal when the door closes. For effective sealing action, the sealing part 14 needs to be partially compressed between the door periphery and the door frame when the door closes, and it is thus necessary for there to be a firm support surface on the opposite side of the sealing part 14 to the door frame. Since the peripheral surface of the door is almost parallel to the direction of the compressive force, the door periphery cannot itself provide this firm support surface and it is provided by the metal carrier 22.

In addition, the metal carrier 22 controls the shape of the sealing part 14 where it is curved to follow curvatures (often in more than one plane) of the door periphery. The slots 36 and 38 enable the carrier to bend to follow such curves. The extended part 24 of the carrier allows the corresponding region of the seal to compress at the position marked "A" in FIG. 2, where the door seal follows a bend in the door. A non-extendible tape may be positioned at B (FIG. 2) so as to prevent stretching of the door seal on the outside of such a bend.

Figure 4:
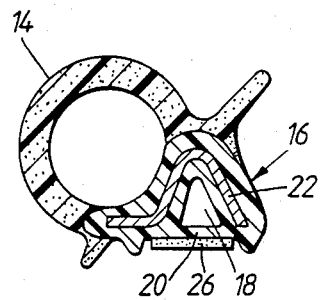
FIG. 4 is a diagrammatic cross-section through a modified form of the door seal shown in FIG. 2.

FIG. 4 shows an enlarged end view of a slightly modified form of the door seal shown in FIG. 2 and parts corresponding to those in FIG. 2 are similarly referenced.

Figure 5:
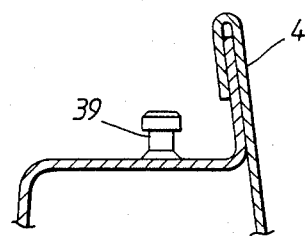
FIG. 5 is a part-sectional view through a vehicle door showing an alternative fixture means.
Figure 6:
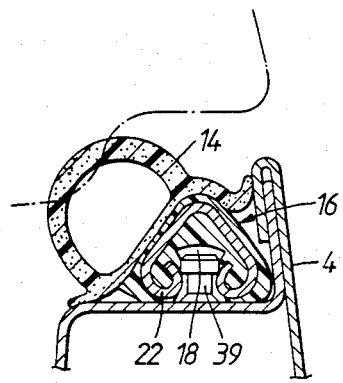
FIGS. 6 and 7 show modified forms of the seal of FIG. 4 which are adapted to co-operate with the fixture means of FIG. 5.
Figure 7:
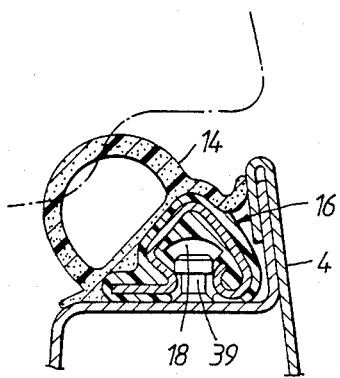

The door seals shown in FIGS. 2 and 4 need not be secured to the door adhesively but could for example be mechanically fixed to it. FIG. 5 shows a welded stud 39 fixed to the door as a means of providing such mechanical fixing. There would be a series of such studs welded to the door at intervals along the path of the seal. FIGS. 6 and 7 show how the shape of the metal carrier 22 could be modified so as to interlock with the studs and thus secure the door seal in position. In the door seals shown in FIGS. 6 and 7, parts corresponding to those in FIG. 2 are similarly referenced.

Figure 8:
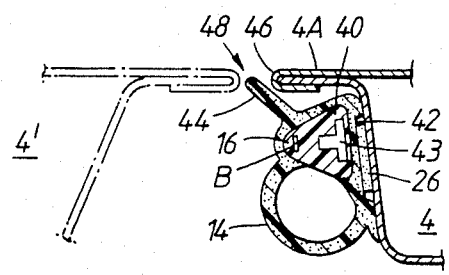
FIG. 8 is a diagrammatic cross-section through part of the door showing another of the door seals, in cross-section, as fitted thereto.

FIG. 8 shows a modified form of the door seal and parts in FIG. 8 corresponding to those in FIG. 2 are similarly referenced.

In the door seal shown in FIG. 8, the interior 18 which receives the metal carrier 22 in the FIG. 2 embodiment is replaced by a similarly shaped solid rubber section 40. This provides the supporting function for the sealing part 14 which, as explained in connection with the embodiment of FIG. 2, is carried out in that embodiment by the metal carrier 22. The door seal of FIG. 8 is recessed at 42 and the adhesive tape 26 is mounted therein for pre-forming the shape of the seal, particularly at more severe curves and concave bends.

As shown at 43, the solid rubber section 40 has a "T" shaped slot running longitudinally through it, in which could be mounted a correspondingly shaped bendable metal strip for strengthening the seal.

FIG. 8 shows the door seal mounted close to the outermost surface 4A of the door. The seal carries a lip 44 which extends over the outer peripheral edge 46 of the door. This lip 44 is intended for sealing off, or partly sealing off, the gap which runs around the outside of the closed door. As shown in FIG. 8, this gap is the gap 48 between the outer periphery 46 of the door and the adjacent periphery of the adjacent door 4' (this gap 48 would therefore be the gap running vertically up the mid point of the "B" pillar in the vehicle). At other parts of the door periphery, the lip 44 could seal off the gap between the peripheral edge 46 of the door and the adjacent body. The lip 44 thus helps further to prevent entry of dirt and moisture around the door aperture and helping to reduce wind noise.

The structure shown in FIG. 8 could of course alternatively be provided with a carrier of the same form as the metal carrier 22 of FIG. 2.

The seal of FIG. 8 could carry a tape embedded at position B for the same purpose as explained above in connection with FIG. 2.

Various modifications may be made to the seals illustrated to suit particular applications. In particular, other means may be used for securing the door seal in position on the door edge. As already explained, mechanical fixing arrangements may be used instead of adhesive tape. Another possibility is that the door seal would have a mounting part running longitudinally along its base which would fit into and interlock with a groove running longitudinally in and around the door periphery.

What is claimed is:

1. A seal for acting between the closure member of a framed opening and the frame of the opening, comprising
   a longitudinally extending support part having a generally flat base surface and being mounted with this surface secured to a generally flat peripheral surface of the closure member, the support part having secured thereto a relatively soft hollow sealing part which is at least partially compressible between the closure member and the frame of the opening, and
   a relatively rigid support member embedded within the support part so as to be positioned adjacent to the sealing part and thereby providing sufficient support for supporting the latter during its partial compression.

2. A seal according to claim 1, in which the relatively rigid support member comprises a longitudinal metal carrier.

3. A seal according to claim 2, in which the metal carrier is at least partially enclosed by flexible material which is extruded integrally with the sealing part and which forms the support part.

4. A seal according to claim 2, in which the carrier is of channel-form and made up of a plurality of side-by-side U-shaped elements which are flexibly mounted in relation to each other so as to facilitate bending of the seal.

5. A seal according to claim 4, in which the carrier includes an extension running longitudinally of the seal and between the sealing part and the closure member and at least slightly longitudinally compressible.

6. A seal according to claim 1, including a substantially non-stretchable tape secured to the surface of the seal remote from the closure member.

7. A seal according to claim 1, in which the support member comprises relatively rigid rubber or plastics material.

8. A seal according to claim 1, secured to the closure member by means of adhesive.

9. A seal according to claim 1, mechanically attached to the closure member.

10. An arrangement for sealing on at least partially recessed framed opening closable by a door or like closure member which at least partially enters the recess, comprising
- a seal extending at least partially around the periphery of the door and mounting thereon so as to be at least partially compressed between the closing door and the frame, and carrying an extension along its length which is positioned so as to seal between at least part of the periphery of the door and the adjacent edge or wall of the recess.

11. An arrangement according to claim 10, in which the seal comprises
- a sealing part defining a generally flat surface running along the length of the seal and secured to a corresponding generally flat surface around the periphery of the door so as to mount the seal thereon,
- a longitudinally extending relatively soft sealing part secured to the support part, and
- a relatively rigid support member embedded within the support part so as to be mounted adjacent to the sealing part and between it and the outside of the door for providing a relatively rigid support when the sealing part undergoes the said partial compression.

12. An arrangement according to claim 11, in which the support member comprises an embedded metal carrier.

13. An arrangement according to claim 11, in which the support member comprises relatively solid material extruded with the material of the sealing part.

14. An arrangement according to claim 10, in which the seal is secured on the door adhesively.

15. An arrangement according to claim 10, in which the seal is mechanically attached to the door.

* * * * *